United States Patent [19]

Nelson et al.

[11] 4,328,036

[45] May 4, 1982

[54] HIGH TEMPERATURE EXPANDING CEMENT COMPOSITION AND USE

[75] Inventors: Erik B. Nelson, Tulsa County; Louis H. Eilers, Rogers County, both of Okla.

[73] Assignee: The Dow Chemical Company, Midland, Mich.

[21] Appl. No.: 218,315

[22] Filed: Dec. 19, 1980

[51] Int. Cl.$^3$ ............................................... C04B 7/00
[52] U.S. Cl. ........................................ 106/85; 106/89; 106/90; 106/98; 106/120; 166/293; 166/294
[58] Field of Search .................... 106/98, 314, 315, 85, 106/89, 90; 166/293, 294

[56] References Cited

U.S. PATENT DOCUMENTS

| | | | |
|---|---|---|---|
| 3,826,665 | 7/1974 | Hovasse et al. | 106/315 |
| 4,028,125 | 6/1977 | Martin | 106/314 |
| 4,036,659 | 7/1977 | Stude | 106/314 |
| 4,256,500 | 3/1981 | Turpin | 106/98 |
| 4,261,755 | 4/1981 | Berry et al. | 106/315 |

*Primary Examiner*—James Poer
*Attorney, Agent, or Firm*—D. H. Fifield

[57] ABSTRACT

A hydratable cement composition useful for preparing a pectolite-containing expanding cement at temperatures above about 150° C. comprising a water soluble sodium salt of a weak acid, a 0.1 molar aqueous solution of which salt has a pH of between about 7.5 and about 11.5, a calcium source, and a silicon source, where the atomic ratio of sodium to calcium to silicon ranges from about 0.3:0.6:1 to about 0.03:1:1; aqueous slurries prepared therefrom and the use of such slurries for plugging subterranean cavities at a temperature of at least about 150° C.

The invention composition is useful for preparing a pectolite-containing expansive cement having about 0.2 to about 2 percent expansion, by volume, when cured at at least 150° C.

21 Claims, No Drawings

HIGH TEMPERATURE EXPANDING CEMENT COMPOSITION AND USE

GOVERNMENT CONTRACT

The Government of the United States of America has rights in this invention pursuant to Contract No. DE-AC02-77-ET-28324 awarded by the U.S. Energy Research and Development Administration.

BACKGROUND OF THE INVENTION

The invention pertains to a composition and a process for plugging a subterranean void where the composition will be subjected to an in situ temperature of about 150° C. or greater in said void. The composition upon hydration at or above the designated temperature exhibits expansive properties making it especially useful for filling the annulus between the casing and the wellbore of a geothermal well. Upon curing, the expansion of said composition provides a tight seal between the casing and the formation and thus prevents communication of fluids between the different zones of the subterranean formation that the wellbore traverses.

Cement compositions capable of expansive behavior when slurries thereof are hydrated have been prepared and used for plugging of subterranean voids, e.g. the annulus between the casing and wellbores of gas, oil and water wells. Such compositions have heretofore depended upon the interaction of the calcium and silicon components of hydraulic cements with sulfate-containing compounds such as gypsum and plaster of Paris. Chem Comp cement is a commercial cement of such a nature. However, when slurries of such expanding cements are subjected to temperatures in excess of about 100° C. they lose their expansive capability.

Nelson and Kalousek, in *Cement and Concrete Research*, Volume 7, page 687 (1977) have discussed the effect of sodium oxide and sodium salts on calcium silicate hydrates at temperatures in the range of 108° to 325° C. They discuss the formation of pectolite from various ratios of calcium/silicon mixes to which the sodium ion is added in the form sodium hydroxide, sodium carbonate or sodium sulfate. Expansive properties of such pectolite-containing materials are not mentioned.

SUMMARY OF THE INVENTION

We have discovered that an expanding, pectolite-containing cement may be formed at temperatures of about 150° C. or greater which has relatively good strength and resistance to degradation by brines at elevated temperatures. The cement is prepared by choosing suitable water-soluble sodium salts of weak acids and combining them with calcium and silicon sources commonly employed in most hydraulic cement compositions. Slurries prepared from the invention cement compositions have sufficiently long thickening times (alone or with conventional retarders) to permit them to be placed in a subterranean void which one desires to plug, in contrast to cement slurries prepared in a similar fashion using sodium hydroxide, sodium sulfate, or sodium carbonate as a source of sodium.

The hydratable cement composition of the invention comprises: Component (A) a water soluble sodium salt of a weak acid, a 0.1 molar aqueous solution of which salt has a pH of between about 7.5 and about 11.5; Component (B) a calcium source; and Component (C) a silicon source; wherein the atomic ratios of sodium:calcium:silicon range from about 0.3:0.6:1 to about 0.03:1:1. Aqueous slurries comprising said cement composition intimately mixed with a quantity of water sufficient to fully hydrate the resultant reaction product are useful for plugging subterranean cavities having a temperature of at least about 150° C. A pectolite-containing, expanding cement is formed in the cavity when such a slurry is placed in the cavity and maintained at such a temperature for a time sufficient to permit the slurry to harden and to expand therein.

DETAILED DESCRIPTION OF THE INVENTION

Pectolite is a mineral represented by the chemical formula $Na_2O(CaO)_4(SiO_2)_6 \cdot H_2O$. In the invention, hydrated cement compositions comprising significant amounts of pectolite are prepared by adding a suitable amount of the sodium salt, previously mentioned, to a finely divided particulate mixture containing a calcium source and a silicon source where the atomic ratio of calcium to silicon in the final mixture ranges from about 0.6 to about 1. Preferably, the hydrated product prepared from such a composition contains about 20 to about 80 percent pectolite, more preferably about 25 to about 50 percent pectolite, by weight. Preferably, the calcium to silicon atomic ratio is less than about 0.8 more preferably less than about 0.7:1. Preferably, the atomic ratio of sodium to silicon is less than about 0.2, more preferably less than about 0.15:1 and is preferably greater than about 0.06, more preferably greater than about 0.08:1.

Where the calcium to silicon ratio is on the low side, the resultant hydrated composition will also contain a significant amount of truscottite and when the calcium to silicon ratio is on the high side it will contain significant amounts of xonotlite. Compositions containing such additional mineral phases are strong, useful plugging materials for subterranean voids at elevated temperatures.

Expansion of the hydrated compositions prepared from the invention cement compositions containing the above described ratios will range from about 0.2 or 0.3 percent, when sodium is at a minimum, up to about 2 percent when sodium is at a maximum, said expansion being expressed as the percent volume increase of a slurry of the invention composition after exposure to at least 150° C. temperature for at least seven days. Preferably, the expansion of such a hydrated composition is less than about 1.5 percent, more preferably less than about 1 percent, most preferably less than about 0.8 percent and is preferably greater than about 0.3 percent, more preferably greater than about 0.4 percent and most preferably greater than about 0.5 percent. Appropriate compositions of the sodium salt and calcium and silicon components may be readily determined by varying the sodium content of the final mixture, exposing a slurry of the composition to 150° C. temperature for seven days and measuring the expansion of the slurry by use of standard methods such as API standard RP 10B. At higher temperature, greater expansion will be attained in a shorter time.

As noted earlier, the sodium salt is a salt of a weak acid and a 0.1 molar aqueous solution of said salt has a pH of between about 7.5 and about 11.5. Suitably the sodium salt is soluble in water to the extent of at least 0.5 grams per 100 grams water at a temperature of 150° C. or greater. Preferably, the calcium salt of the same anion is soluble to the extent of at least 0.1 gram per 100 grams water at the temperature of about 150° C. or greater. One preferred group of salts is the sodium salts of carboxylic acids comprising 1 to 4 carbon atoms, more preferably those of monocarboxylic acids within this range. Another preferred group of such salts is salts containing as the anion thereof the formate, acetate, propionate, citrate, oxalate, tartrate, bicarbonate, thiocyanate, fluosilicate or borate radical. More preferably, the sodium salt is selected from sodium acetate, sodium formate, sodium bicarbonate and sodium thiocyanate. Component A may comprise one or more of the foregoing sodium salts and may additionally comprise other sodium salts in minor amounts to the extent that the pH of a resultant aqueous solution containing such salt mixtures is not outside the range of about 7.5 to about 11.5. For example, about 20 percent by weight of sodium hydroxide may be added to sodium acetate since the acetate acts as a buffer and the pH range of the resultant aqueous solution is not significantly affected. Similarly, other sodium salts (such as sodium sulfate) which are not generally within the definition of the prescribed sodium salts may be added in minor proportions. Most preferably, Component A consists essentially of one or more of the prescribed sodium salts which yield a solution within the given pH range. Preferably, the resultant pH of an aqueous solution of about 0.1 molar sodium salt concentration is above about 8, more preferably above about 8.5 and is preferably below about 11, more preferably below about 10.5.

Component B, a calcium source, is suitably any active calcium compound containing calcium available for reaction with silicon to form hydrated calcium silicates. For example, calcium oxides such as various forms of lime, and calcium silicate are suitable calcium sources. Preferably, calcium silicates such as are found in hydraulic cement, for example a Portland cement or a Class J cement are employed in this capacity. More preferably, a Portland cement in which the calcium to silica ratio is at least about 20 to 1 is employed and more preferably, Portland cement in which the tricalcium silicate content is at least about 50 percent is employed as Component B. In one preferred embodiment, the calcium to silica ratio of Component B ranges from about 0.6:1 to about 3:1. In another preferred embodiment, Component B consists essentially of a hydraulic cement wherein the calcium:silica ratio ranges from about 0.6:1 to about 3:1.

Component C is suitably any reactive silicon source, preferably a silica-containing material. Suitable such materials are sand, silica flour, fly ash and other natural pozzolans. Included for the purpose of calculation in determining the amount of silicon present in the invention composition are the silicon portions in any calcium silicate employed as a source of calcium in Component B. However, since the preferred source of calcium for Component B is a hydraulic cement with a calcium to silica ratio of about 0.6:1 to about 3:1, ordinarily additional silicon containing material must be supplied as Component C. If the sodium salt of Component A contains silicon, e.g. sodium fluosilicate, the silicon content of that salt should also be considered in the determining the appropriate amount of Component C to be included. Preferable sources of silicon are silica (i.e. silicon dioxide), silica flour, a finely divided silica of relatively high surface area and acid washed diatomaceous earth commonly sold as Diacel D. Because silica available as diatomaceous earth has a very high surface area, larger amounts of water must be added to compositions comprising it in order to prepare a mixable, pumpable slurry of same. Consequently, the resultant slurry is relatively lighter in weight than a slurry prepared from silica or silica flour. Various sources of silica are well known to those skilled in art as is the effect on the resultant slurry and the handling properties of choosing calcium or silicon sources having extremely high surface area. This effect is discussed further below.

Since the preferred calcium and silicon sources have limited water solubility, they are suitably added as finely divided particles to permit the chemical reaction which forms the ultimate hardened product to proceed at a reasonable rate. As used herein, the term Blaine "fineness" or "specific surface" refers to the specific surface of a particulate material determined according to ASTM standard method C204. Suitably, Component B has a specific surface of between about 500 and about 5,000 $cm^2/g$. Preferably Component B has a specific surface of up to about 4,000 and more preferably up to about 3,000 $cm^2/g$. Preferably the specific surface is greater than about 1500 and more preferably greater than about 2,000 $cm^2/g$. With respect to Component C, a specific surface of between about 1,000 and about 15,000 $cm^2/g$ is suitable with the higher end of the range being encountered typically with finely powdered material such as diatomaceous earth and the lower end of the range being found with more coarse material such as silica or silica flour. Preferably, the specific surface of Component C is less than about 6,000, more preferably less than about 4,000 $cm^2/g$ and is preferably greater than about 1,000, more preferably greater than about 1,500 $cm^2/g$.

In preparing the slurries of the invention, enough water should be added to the cement composition to fully hydrate the mixture at temperatures above about 150° C. Suitably about 30 to about 200 percent water, based on the weight of the other components of the cement composition will be employed. Preferably less than about 150 percent, more preferably less than 120 and most preferably less than about 100 percent and preferably greater than about 35, more preferably greater than about 40 and most preferably greater than about 50 percent water is employed in preparing the aqueous slurries of the invention. The amount of water necessary for fully hydrating a given cementitious composition is well known and determinable by those skilled in the art. Suitably one will add a quantity of water which provides a slurry of a consistency convenient for handling or pumping with any given equipment designed for this purpose. Generally, in preparing a slurry from the composition where Components B and C are very finely divided, e.g. having a specific surface of above about 3,000 $cm^2/g$ (Blaine) it will be necessary to add greater amounts of water to obtain a mixable and pumpable slurry. Such mixes with these greater amounts of water are suitably employed when a lightweight slurry is ultimately desired.

Other additives in the composition may include any common inert additives and fillers or fluid loss additives which do not significantly vary pH of the aqueous slurry. In amounts which lower the Ca:Si ratio to less than 0.6:1, silica may be considered as such an inert additive. It may be incorporated although benefits of the invention will be reduced due to the resultant dilution of the final product by such excess silica in the same way other inert additives will, in large amounts, have such a diluting effect. Accelerators are not usually required since the resultant aqueous slurries are usually relatively fast setting. In fact, retarders are generally beneficially employed to permit sufficient working time to mix and place the aqueous slurries of the invention. Suitable retarders will provide a slurry having a thickening time of about 5 or 6 hours and may be selected from known retarders such as lignin and sugar derivatives; for example, sodium lignosulfonates and oxidized sugar salts.

The invention cement compositions and aqueous slurries may be prepared by standard mixing techniques using a mechanical blending device that produces a uniform product. Dry components may be preblended and thereafter slurried with water or the less soluble dry components such as Component B and C may be preblended and Component A may be dissolved in the water to be employed in preparing the aqueous slurries. From an operational standpoint, such slurries are normally prepared at the job site and gravity fed or pumped directly into a passage communicating from the surface to a subterranean void to be plugged. In wells, the usual technique is to pump the slurry down a piece of pipe or casing and up the annulus between it and the borehole penetrating the subterranean formation.

In use, the cement composition is not appreciably reactive at less than about 150° C. except over long periods of time. Consequently, for practical application, the aqueous cement slurry is exposed to temperatures in excess of about 150° C., preferably in excess of about 160° C., more preferably in excess of about 180° C. and most preferably in excess of about 200° C. Preferably, the temperature to which the slurry will be exposed is less than about 325° C., more preferably less than about 300° C. and most preferably less than about 275° C.

More details about the preparation and application of the cement composition of the invention are described hereafter in the specific embodiments.

SPECIFIC EMBODIMENTS OF THE INVENTION

In the following examples, preparation of cement composition of the invention and their respective slurries is described and various physical properties of the slurries or of the resultant hydrated reaction products are set forth. Comparative slurries and physical properties are also described. All slurries are mixed according to API Standard RP 10B Section 3. Thickening times are measured in accordance with RP 10B Section 7, Schedule 30 with a 1.7° F. (about 0.94° C.) temperature gradient and a final temperature of 300° F. (about 150° C.).

Expansion of various slurries after 3 or 7 days hydration under 3,000 to 6000 psi pressure at 300° F. (about 150° C.) or 400° F. (about 205° C.) is measured in a split-ring mold described in copending application Ser. No. 134,716 filed Mar. 27, 1980, by L. B. Spangle, the disclosure of which is hereby incorporated by reference. Basically, the linear expansion of a thickened slurry is measured by determining the distance of movement of two points on the circumference of about a 2 inch length of 321 W.D. stainless steel 0.035 inch tubing of about 1.65 inch I.D., split longitudinally to permit opening of the resultant "C-shaped" cross-section of pipe in response to the expansion of a hydrating cementitious slurry contained therein. The volumetric expansion is correlated to the linear divergence of two opposite points on the circular cross-section, at the mouth of the "C", by simple mathematical calculations. Compressive strength of the various hydrated cement slurries after 7 days is measured according to API standard RP 10B Section 6.

The cement samples are prepared from Kaiser Class G Portland cement ("Class G") or Universal Atlas Class J cement ("Class J") having specific surfaces of about 3300 cm$^2$/g (Blaine) and about 2200 cm$^2$/g (Blaine), respectively. They are employed as Component (A) of the invention compositions. Class G contains about 64% by weight calcium oxide and about 22% silicon dioxide (Ca:Si about 3.2:1) and Class J contains about 37% calcium oxide and about 54% silicon dioxide (Ca:Si about 0.7).

The above mentioned calcium source is dry blended with other dry components including sufficient silica flour (98+ percent silicon dioxide) having specific surface of about 1500 cm$^2$/g (Blaine), to attain the desired Ca:Si ratio, counting the silicon present from other components. In one instance, acid washed diatomaceous earth (hereafter "DE") sold as Diacel D (95+ percent silicon dioxide) and having a specific surface of about 16,000 cm$^2$/g (Blaine) is incorporated to prepare a composition useful in a lightweight slurry. The dry component blend is added to a selected quantity of water with mixing, i.e. in a Waring blender. Further details are set forth below.

All parts are by weight unless otherwise specified. Abbreviations of "DE", "Class G" and "Class J" are defined above. Where employed hereafter, the following materials are represented by the following abbreviations: sodium hydroxide—"NaOH"; sodium acetate—"NaAc"; sodium formate—"NaFo"; sodium citrate—"NaCit"; sodium oxalate—"NaOx"; sodium thiocyanate—"NaThi"; sodium metasilicate—"NaSi"; sodium fluosilicate—"NaFS"; retarder—"Rtdr"; silica flour—"SF". The retarder employed comprises about equal parts of a lignin derivative and a glucoheptonate salt, as described in U.S. Pat. No. 3,234,154.

EXAMPLE 1—Thickening Times

The thickening times of various comparative slurries (Run 1.1, 1.2 and 1.3) and samples of invention slurries (Run 1.4, 1.5, 1.6 and 1.7) are measured according to API standard RP 10B Section 7, as described earlier. The compositions of the various slurries and the corresponding thickening times are set forth in following Table I. In all runs, Class G is present at 100 parts.

TABLE I

| | | THICKENING TIME | | | | | | |
|---|---|---|---|---|---|---|---|---|
| Run No. | Atomic Ratio Na:Ca:Si | API Thickening Time Hrs:Mins | Maximum Temp. °C. | Parts SF | Parts Water | Parts RTDR | Sodium Salt Type-Parts | Type Other Parts |
| 1.1 | 0:1.2:1 | 3:27 | 150 | 35 | 54 | 1.0 | NONE | NONE |
| 1.2 | .32:0.75:1 | 0:10 | 50 | 70 | 75 | 2.0 | NONE | NaOH-20 |
| 1.3 | .31:0.76:1 | 0:29 | 135 | 40 | 100 | 2.0 | NONE | NaSi-50 |
| 1.4 | .48:0.75:1 | 6:00+ | 150 | 70 | 60 | 1.5 | NaAc-50 | NaOH-5 |
| 1.5 | .36:0.74:1 | 3.07 | 150 | 65 | 70 | 0.5 | NaAc-30 | NaFS-18 |
| 1.6 | .36:0.74:1 | 6:00+ | 150 | 65 | 70 | 0.6 | NaAc-30 | NaFS-18 |

TABLE I-continued

| | | THICKENING TIME | | | | | | |
|---|---|---|---|---|---|---|---|---|
| Run No. | Atomic Ratio Na:Ca:Si | API Thickening Time Hrs:Mins | Maximum Temp. °C. | Parts SF | Parts Water | Parts RTDR | Sodium Salt Type-Parts | Type Other Parts |
| 1.7 | .34:0.75:1 | 4:18 | 150 | 70 | 70 | 0.6 | NaAc-50 | NaOH-2 |

EXAMPLE 2—Expansion and Compressive Strength

The expansion and compressive strength of various comparative slurries and samples of invention slurries area measured, as previously described, after curing for 3 to 7 days at about 150° C. (3000 psi) or about 205° C. (6000 psi). Since the thickening time of these samples is not critical in these experimental determinations, two samples employed in Runs 2.1 and 2.2 are prepared using sodium hydroxide as the sodium source to attain slurries of the desired Na:Ca:Si ratios. In actual field operation, the sodium hydroxide would be substantially replaced with specified sodium salts to attain a suitably long thickening time to permit placement of the slurry. Other samples of slurries are employed in which some of the specified sodium salt is partially replaced with sodium hydroxide. The reactivity of the silica flour appears to be enhanced in this manner. Compositions of the various slurries are set out in Table II and their respective Expansion and Compressive Strengths are set out in Table III. All compositions contain 100 parts of cement.

TABLE II

| | | SLURRY COMPOSITION | | | | | | |
|---|---|---|---|---|---|---|---|---|
| Slurry No. | Atomic Ratio Na:Ca:Si | Cement Type | Parts SF | Parts Water | Sodium Salt Type-Parts | Parts NaOH | Type Other-Parts | Parts Rtdr |
| 2.1 | 0:1.2:1 | Class G | 35 | 54 | NONE | NONE | NONE | 1.0 |
| 2.2 | 0:0.8:1 | Class G | 65 | 63 | NONE | NONE | NONE | 1.0 |
| 2.3 | .32:0.75:1 | Class G | 70 | 65 | NONE | 20 | NONE | 1.0 |
| 2.4 | .26:0.62:1 | Class G | 60 | 185 | NONE | 20 | DE-30 | 1.0 |
| 2.5 | .42:0.8:1 | Class G | 65 | 70 | NaAc-40 | 5 | NONE | 0.5 |
| 2.6 | .22:0.8:1 | Class G | 65 | 70 | NaAc-20 | 3 | NONE | 0.5 |
| 2.7 | .17:0.8:1 | Class G | 65 | 63 | NaAc-17 | 1.5 | NONE | 0.5 |
| 2.8 | .13:0.8:1 | Class G | 65 | 70 | NaAc-10 | 3 | NONE | 0.5 |
| 2.9 | .21:1:1 | Class G | 47 | 57 | NaAc-17 | 1.5 | NONE | 0.5 |
| 2.10 | .17:0.8:1 | Class G | 65 | 63 | NaFo-14 | 1.5 | NONE | 0.5 |
| 2.11 | .13:1:1 | Class G | 47.5 | 60 | NaFo-8.5 | 1 | NONE | 0.5 |
| 2.12 | .14:1:1 | Class G | 47.5 | 60 | NaCit-12 | 1 | NONE | 0.5 |
| 2.13 | .11:1:1 | Class G | 47.5 | 60 | NaThi-10 | NONE | NONE | 0.5 |
| 2.14 | .13:1:1 | Class G | 47.5 | 60 | NaThi-10 | 1 | NONE | 0.5 |
| 2.15 | .13:1:1 | Class G | 47.5 | 60 | NaOx-8.5 | 1 | NONE | 0.5 |
| 2.16 | .36:0.74:1 | Class G | 6.5 | 70 | NaAc-20 | 5 | NaFS-18 | 0.6 |
| 2.17 | .33:0.5:1 | Class J | 26 | 48 | NaAc-29.6 | 3.7 | NONE | 0.4 |

TABLE III

| | EXPANSION & COMPRESSIVE STRENGTH | | | | |
|---|---|---|---|---|---|
| Slurry No. | Temp °C. | Press PSI | Percent Expansion 3 Days | Percent Expansion 7 Days | Atomic Ratio Na:Ca:Si | 7 Day Compressive Strength - PSI |
| 2.1 | 150 | 3000 | .17 | .19 | 0:1.2:1 | about 5000 |
| 2.2 | 150 | 3000 | .29 | * | 0:0.8:1 | about 4500 |
| 2.3 | 205 | 6000 | * | .83 | .32:0.75:1 | 3360 |
| 2.4 | 205 | 6000 | * | .42 | .26:0.62:1 | 1390 |
| 2.5 | 150 | 3000 | 2.60 | 2.97 | .42:0.8:1 | 1255 |
| 2.6 | 150 | 3000 | 1.37 | 1.31 | .22:0.8:1 | 1440 |
| 2.7 | 150 | 3000 | 1.06 | * | .17:0.8:1 | * |
| 2.8 | 150 | 3000 | .58 | .83 | .13:0.8:1 | 3480 |
| 2.9 | 150 | 3000 | .93 | * | .21:1:1 | * |
| 2.10 | 150 | 3000 | .50 | * | .17:0.8:1 | * |
| 2.11 | 205 | 6000 | .23 | .30 | .13:1:1 | 5880 |
| 2.12 | 205 | 6000 | .31 | .38 | .14:1:1 | 3815 |
| 2.13 | 205 | 6000 | .25 | .30 | .11:1:1 | 2025 |
| 2.14 | 205 | 6000 | .29 | .38 | .13:1:1 | 3050 |
| 2.15 | 205 | 6000 | .56 | .81 | .13:1:1 | 4880 |
| 2.16 | 205 | 6000 | .80 | .97 | .36:0.74:1 | 3715 |
| 2.17 | 150 | 3000 | .20 | * | .33:0.5:1 | 2175 |
| 2.17 | 205 | 6000 | .53 | * | .33:0.5:1 | 2580 |

*Signifies not tested.

We claim:

1. A hydratable cement composition useful for preparing pectolite-containing expanding cement at temperatures above about 150° C. which comprises:

Component (A) comprising a water soluble sodium salt of a weak acid, a 0.1 molar aqueous solution of which salt has a pH of between about 7.5 and about 11.5; Component (B) a calcium source; and Component (C) a silicon source;

wherein the atomic ratios of sodium:calcium:silicon range from about 0.3:0.6:1 to about 0.03:1:1.

2. The composition of claim 1 wherein Component (A) comprises a sodium salt wherein the anion of said salt is selected from the group consisting of formate, acetate, propionate, citrate, tartrate, bicarbonate, thiocyanate, fluosilicate and borate radicals.

3. The composition of claim 1 wherein Component (A) comprises a sodium salt wherein the anion of said salt is selected from carboxylate radicals comprising one to four carbon atoms.

4. The composition of claim 3 wherein said carboxylate radicals are monocarboxylate radicals.

5. The composition of claim 1 wherein Component (A) comprises sodium acetate.

6. The composition of claim 1 wherein Component (A) consists essentially of one or more water soluble sodium salts of a weak acid, a 0.1 molar aqueous solution of which salt has a pH of between about 7.5 and about 11.5.

7. The composition of claim 1 wherein Component (A) consists essentially of one or more sodium salts selected from sodium formate, acetate, propionate, citrate, tartrate, bicarbonate, thiocyanate, fluosilicate or borate.

8. The composition of claim 1, 2, 3, 5, 6, or 7 wherein the atomic ratio ranges from about 0.15:0.6:1 to about 0.08:0.7:1.

9. The composition of claim 1 wherein Component (B) comprises a hydraulic cement having a calcium:silicon atomic ratio in the range of from about 3:1 to about 0.6:1.

10. The composition of claim 1 or 9 wherein Component (C) comprises silica.

11. The composition of claim 1 wherein Component (A) consists essentially of sodium acetate; Component (B) consists essentially of a hydraulic cement having a calcium:silicon atomic ratio in the range of from about 3:1 to about 0.6:1; and Component (C) consists essentially of silica.

12. The composition of claim 1, 2, 3, 4, or 9 where a 0.1 molar aqueous solution of said salt has a pH of between about 8 and about 11.

13. An aqueous cementitious slurry comprising the cement composition of claim 1 intimately mixed with a quantity of water sufficient to fully hydrate the resultant reaction product of said water and composition when subjected to a temperature of at least about 150° C.

14. The composition of claim 1 which further comprises a retarder in an amount sufficient to allow an aqueous slurry of same to thicken in about 3 to about 6 hours at a temperature of at least about 150° C.

15. A slurry of claim 13 which comprises about 30 to about 200 percent water, based on the weight of the cement composition.

16. A method of plugging a subterranean cavity having a temperature of at least 150° C. whereby a pectolite-containing expanding cement is formed in said cavity, comprising:
 (1) placing in said cavity; the slurry of claim 13; and
 (2) maintaining said slurry to said cavity for a time sufficient to permit said slurry to harden and expand therein.

17. The method of claim 16 wherein expansion of up to about 1 percent, by volume of the slurry, occurs upon hardening for at least 7 days.

18. The method of claim 17 wherein said expansion does not exceed about 0.8 percent.

19. The method of claim 16, 17 or 18 wherein expansion exceeds about 0.3 percent, by volume of the slurry, upon hardening for at least 7 days.

20. The method of claim 16 wherein the slurry employed is a slurry wherein Components (A), (B) and (C) consists essentially of sodium acetate, a Portland cement and silica, respectively, and which further comprises about 40 to about 120 percent water, based on the combined weight of Components (A), (B), and (C).

21. The method of claim 16, 18 or 20 wherein said slurry further comprises an amount of a retarder sufficient to permit same to thicken in about 3 to about 6 hours when exposed to a temperature of at least about 150° C.

* * * * *

UNITED STATES PATENT AND TRADEMARK OFFICE
CERTIFICATE OF CORRECTION

PATENT NO. : 4,328,036
DATED : May 4, 1982
INVENTOR(S) : Erik B. Nelson et al.

It is certified that error appears in the above—identified patent and that said Letters Patent is hereby corrected as shown below:

Col. 3, line 54, delete "in" and insert --of--.
Col. 10, Claim 16, line 11, delete "to" and insert --in--.

Signed and Sealed this

Seventh Day of September 1982

[SEAL]

Attest:

GERALD J. MOSSINGHOFF

*Attesting Officer*     *Commissioner of Patents and Trademarks*